United States Patent [19]
Nagata

[11] Patent Number: 6,133,840
[45] Date of Patent: *Oct. 17, 2000

[54] APPARATUS USING VIBRATION MOTOR

[75] Inventor: Naohisa Nagata, Numazu, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,903

[22] Filed: Sep. 23, 1997

[30] Foreign Application Priority Data

Oct. 3, 1996 [JP] Japan ................................. 8-263255

[51] Int. Cl.[7] ........................................ G08B 21/00
[52] U.S. Cl. ................. 340/648; 340/635; 318/431; 318/727
[58] Field of Search ................... 340/648, 635, 340/649, 650, 652; 361/23, 28, 29, 25; 310/68 B, 68 C, 68 R, 316; 318/638, 727, 431, 254

[56] References Cited

U.S. PATENT DOCUMENTS

| | | | |
|---|---|---|---|
| 4,533,257 | 8/1985 | Kitano et al. | 368/202 |
| 4,727,276 | 2/1988 | Izukawa et al. | 310/316 |
| 5,235,264 | 8/1993 | Kaneda et al. | 318/727 |
| 5,396,159 | 3/1995 | Kaneda | 318/431 |
| 5,444,340 | 8/1995 | Tamaki et al. | 318/139 |
| 5,841,260 | 11/1998 | Imai | 318/638 |
| 5,844,237 | 3/1999 | Kanki et al. | 702/113 |

FOREIGN PATENT DOCUMENTS

| | | |
|---|---|---|
| 0 382 563 A2 | 8/1990 | European Pat. Off. . |
| 58-14682 | 1/1983 | Japan . |
| 59-204477 | 11/1984 | Japan . |
| 60-176470 | 9/1985 | Japan . |
| 63-1379 | 1/1988 | Japan . |

OTHER PUBLICATIONS

European Search Report dated Jan. 21, 1998.

*Primary Examiner*—Daniel J. Wu
*Assistant Examiner*—Van T. Trieu
*Attorney, Agent, or Firm*—Fitzpatrick, Cella, Harper & Scinto

[57] ABSTRACT

An apparatus using a vibration motor as a drive source is arranged to inhibit a starting action of the vibration motor when the motor is found to be in a sticking state and not drivable. The arrangement effectively prevents inconveniences from being caused by an attempt to drive the motor by continuously applying a driving signal to the motor when the motor is in the sticking state.

16 Claims, 5 Drawing Sheets

APPARATUS USING VIBRATION MOTOR

BACKGROUND OF THE INVENTION

1. Field of the Invention

The present invention relates to a motor for use in an apparatus, such as an image forming apparatus, which uses a motor (in particular, a vibration motor) as a drive source thereof.

2. Description of Related Art

Motors used, e.g., as drive motors for apparatuses of various kinds include DC motors, stepping motors, AC motors, vibration motors, etc. Among these motors, a vibration motor is desirably used for driving a photosensitive drum or the like of a copying machine (image forming apparatus). The vibration motor is composed of a vibrating body, which is arranged to be excited to vibrate by high-frequency voltage signals (a driving signal) applied to electric-to-mechanical energy converting elements (electromechanical energy conversion elements), and a contact body, which is arranged to be in contact with the vibrating body, as disclosed, for example, in Japanese Laid-Open Patent Applications No. SHO 58-14682, No. SHO 63-1379, No. SHO 60-176470 and No. SHO 59-204477. The vibrating body and the contact body are thus arranged to be frictionally driven relative to each other by the vibration energy of the vibrating body.

Since the vibration motor excels in speed stability at a low speed and thus does not require speed reduction by means of gears or the like, operations can be performed at a low noise level. In a copying machine, which is required to operate at low levels of vibration and noise, therefore, the use of a vibration motor is most suited for accurate control of the rotation of a photosensitive drum, which directly influences the picture quality of a copy.

The vibration motor, however, has presented a problem in the following point. In the event of dew condensation within the vibration motor as a result of a sudden change in ambient temperature, the moisture of the dew might cause the vibrating body and the contact body to stick to each other. To relieve the vibration motor from such a sticking state, it has been practiced to automatically raise the high-frequency voltage signal by a feedback control means, which is arranged to compare the above-stated applied high-frequency voltage signal with the driving state of the vibration motor and to control the high-frequency voltage signal according to the result of comparison.

However, the sticking state of the vibration motor sometimes cannot be readily removed by simple raising the high-frequency voltage signal, and thus brings about an inadequate building-up state, depending on the degree of sticking. Under such a condition, the photosensitive drum driven by the vibration motor cannot be synchronized with a transfer belt which is driven by another drive source. The failure of synchronization tends to cause the transfer belt to be damaged.

Further, continuous application of the high-frequency voltage signal causes the vibration motor to overheat, and thus might cause some trouble.

Further, repeating an attempt to forcibly drive the vibration motor in a sticking state degrades the wow flutter of the vibration motor, thereby making it hardly possible to obtain a stable motor rotation.

BRIEF SUMMARY OF THE INVENTION

To solve the above-stated problems, in accordance with one aspect of the invention, there is provided an apparatus which comprises a motor used as a drive source for driving a photosensitive drum or the like, determining means for determining whether the motor is in a sticking state, and restraining means for restraining (inhibiting) a driving signal from being applied to the motor when the motor is determined by the determining means to be in the sticking state.

In accordance with another aspect of the invention, there is provided an apparatus which comprises, in addition to the elements of the apparatus mentioned above, display means for displaying a result of the determination provided by the determining means (particularly, indicating that the motor is in the sticking state), so that the operator of the apparatus can be advised to perform an operation for relieving the motor from the sticking state.

In accordance with a further aspect of the invention, there is provided an apparatus which comprises, in addition to the elements of the apparatus mentioned above, replacement indicating means for indicating that the motor should be replaced, if the determining means has determined a predetermined number of times or more that the motor is in the sticking state.

Since any sticking state of the motor that repeatedly takes place suggests an impending end of service life of the motor, possible troubles due to the end of the service life of the motor can be prevented with the operator urged in advance by the replacement indicating means to replace the motor.

These and other aspects, objects and features of the invention will become apparent from the following detailed description of an embodiment thereof taken in connection with the accompanying drawings.

DETAILED DESCRIPTION OF THE INVENTION

Hereinafter, a preferred embodiment of the invention will be described in detail with reference to the drawings.

Figure 1:
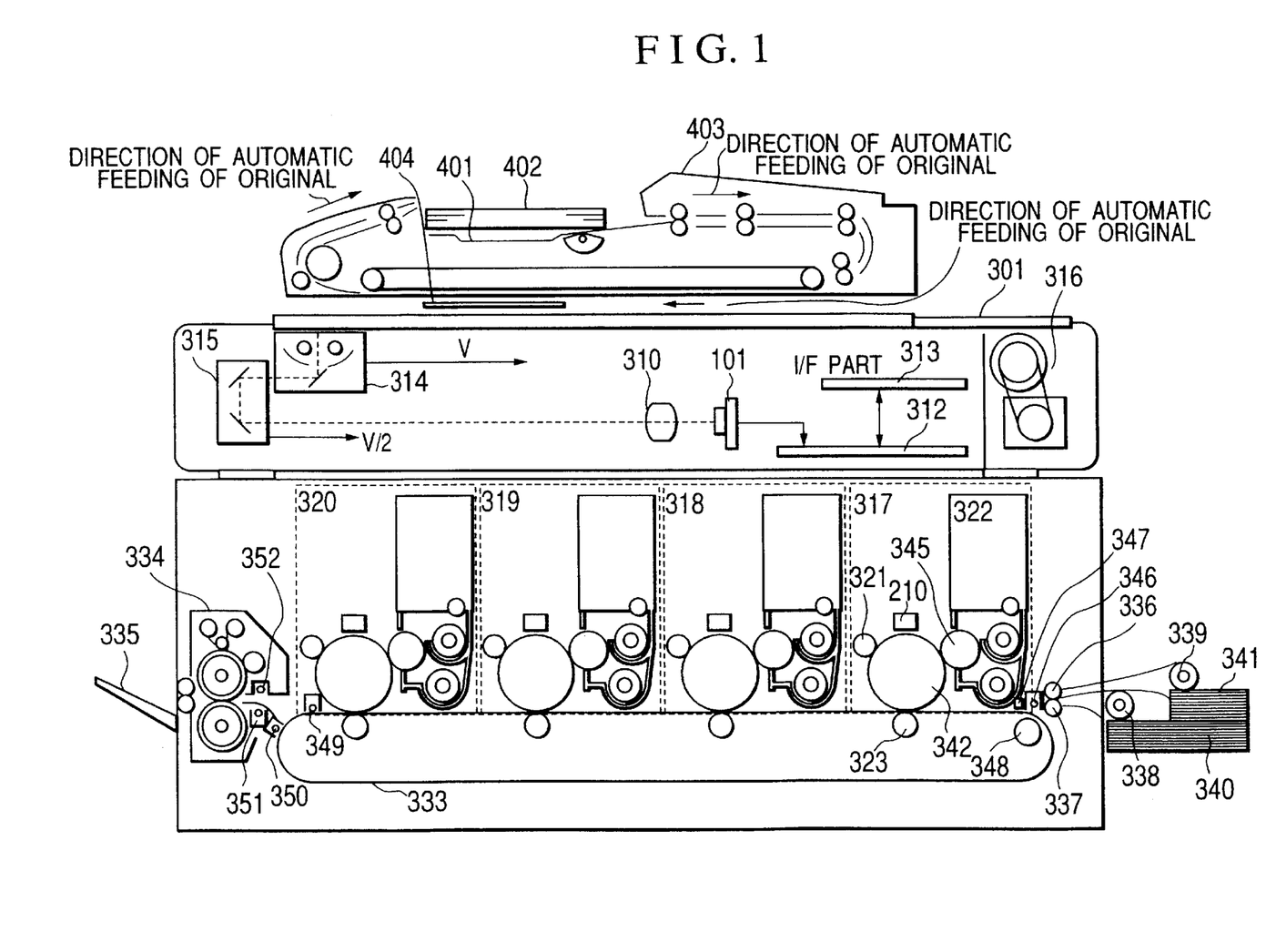
FIG. 1 is a sectional view showing in outline the arrangement of a color copying machine according to the invention as a first embodiment thereof.

FIG. 1 is a sectional view showing in outline a color copying machine arranged according to the invention as a preferred embodiment of the invention. The arrangement of an image reader part of the copying machine is first described. Referring to FIG. 1, a CCD unit 101 is arranged to read an image of an original. A correction control part 312 is arranged to make shading correction and input masking for an image processing unit (not shown) and also to carry out magnification varying and gamma correcting processes, etc.

An original placing board 401 is shown as having a plurality of originals 402 placed thereon. An automatic original feeding device 403 is arranged to serially transport the plurality of originals 402 and to control an automatic continuous copying action. Reference numeral 404 denotes an original which is in process of being transported.

Figure 4:
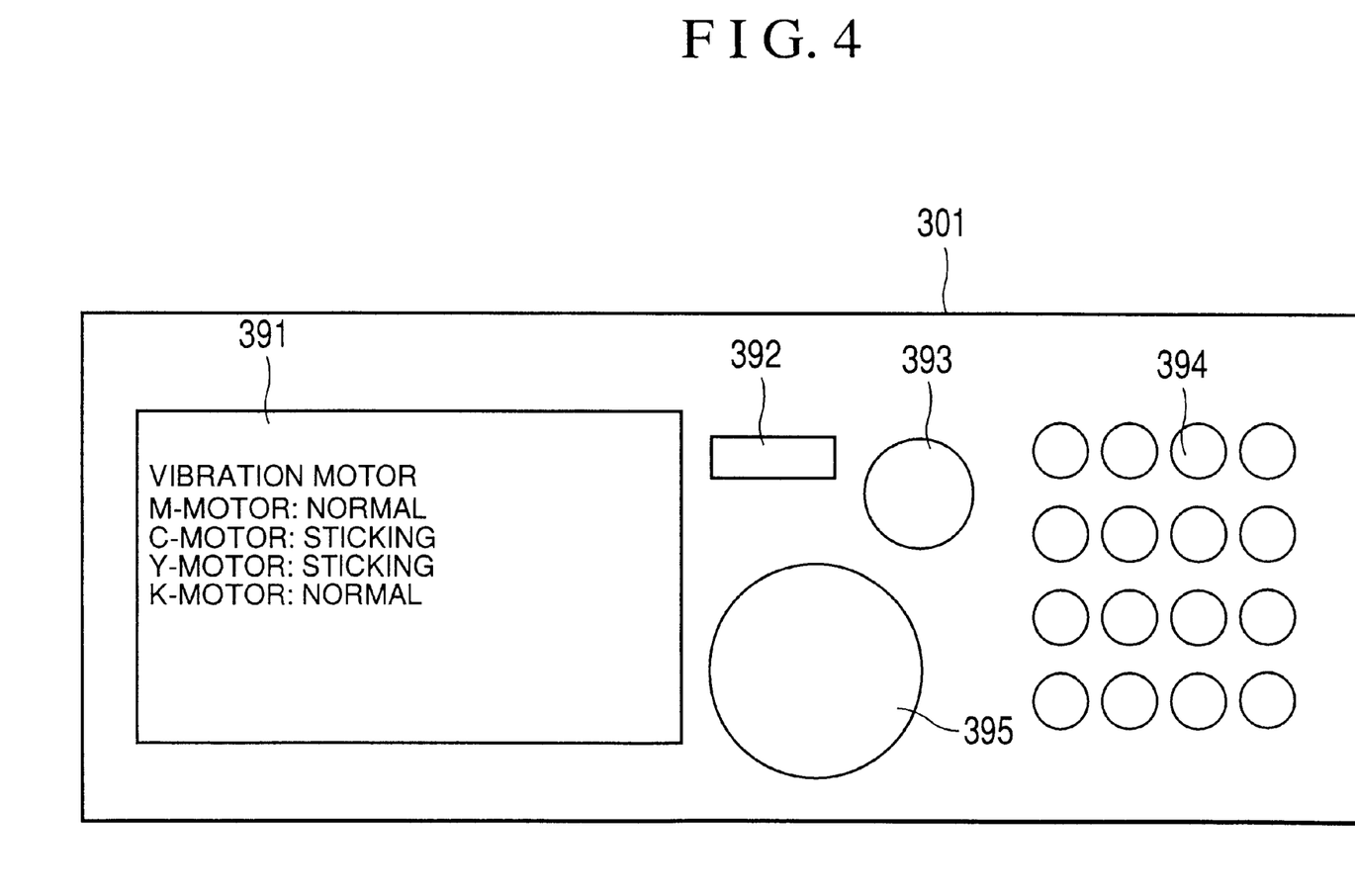
FIG. 4 is a plan view showing an operation part provided on the copying machine.

An operation part 301 is arranged to permit various inputs at the time of copying. As shown in FIG. 4, the operation part 301 is provided with various operation switches 392 to 395 and a message display panel 391.

A light source carriage 314 has a light source unit arranged there to illuminate the original 404. A mirror carriage 315 has a mirror unit arranged thereon to vary the optical path of reflected light coming from the original 404. A lens 310 is arranged to converge the reflected light of the original 404 onto the CCD unit 101. An interface (I/F) part 313 is provided for other IPUs (information processing units) or the like.

The whole surface of the original 404 is scanned (auxiliary scanning) by mechanically moving the light source carriage 314 at a speed V and the mirror carriage 315 at a speed V/2 in a direction perpendicular to the direction of electrical scanning (main scanning) of the CCD unit 101.

The arrangement of the printer part of the copying machine is next described. The printer part includes an M (magenta) image forming part 317, a C (cyan) image forming part 318, a Y (yellow) image forming part 319 and a K (black) image forming part 320. Since the M, C, Y and K image forming parts 317 to 320 are arranged in the same manner, the details of only the M image forming part 317 are described below to cover all the image forming parts.

Figure 2:
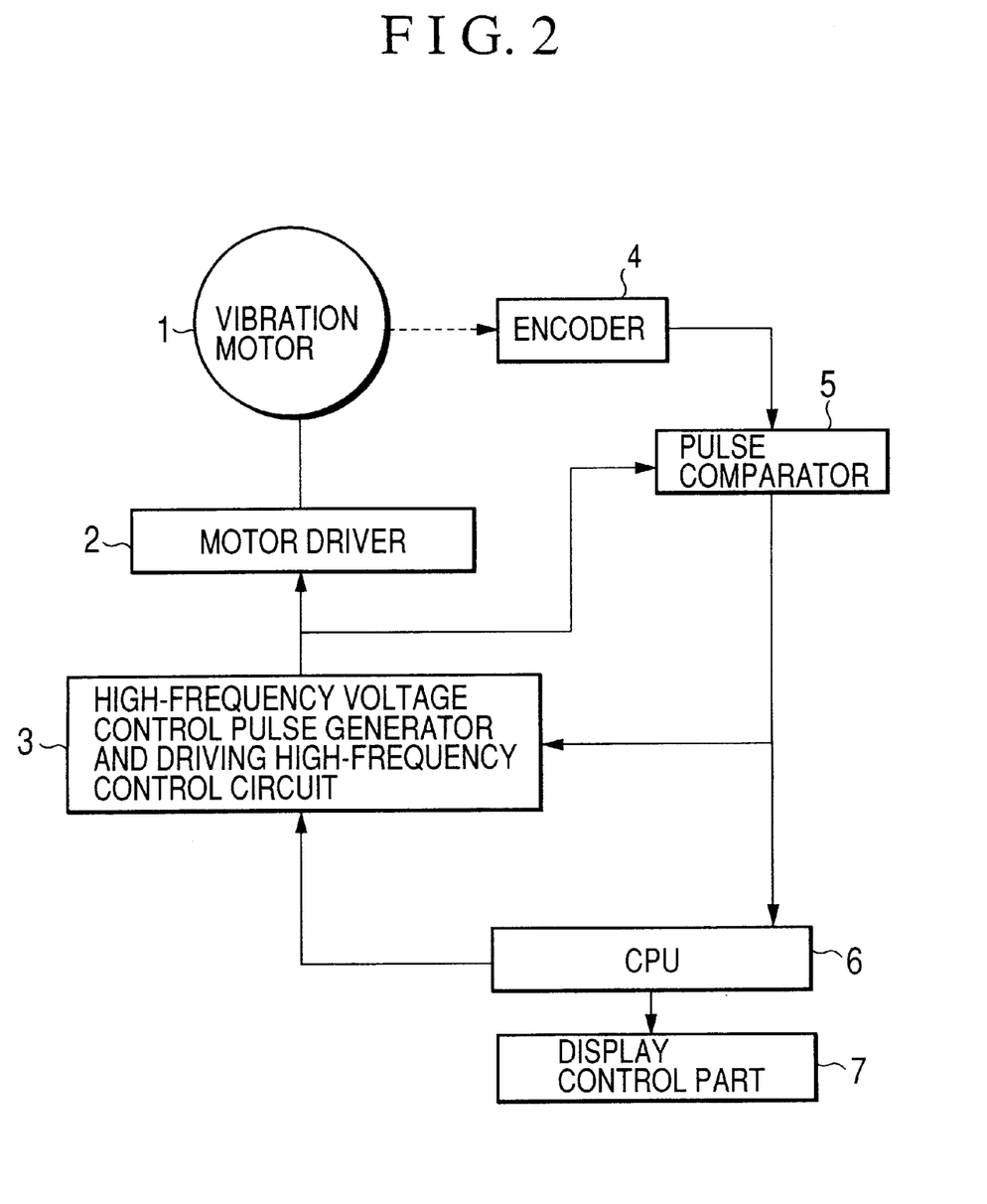
FIG. 2 is a block diagram showing a control device arranged to control a vibration motor employed in the above-stated copying machine.

In the M image forming part 317, a photosensitive drum 342 is arranged to be driven by a vibration motor (see FIG. 2). On the surface of the photosensitive drum 342, a latent image corresponding to the image of the original 404 is formed by light emitted from an LED array 210. A primary charger 321 is arranged to prepare the photosensitive drum 342 for forming the latent image by charging the surface of the photosensitive drum 342 up to a predetermined level of potential.

A developing unit 322 is arranged to form a toner image by developing the latent image formed on the surface of the photosensitive drum 342. The developing unit 322 includes a sleeve 345 for developing the latent image by applying a developing bias. A transfer belt 333 is arranged to be driven by a transfer belt roller 348. The transfer belt roller 348 is arranged to be driven by a DC motor (not shown).

A transfer charger 323 is arranged to discharge electric-energy from behind the transfer belt 333 in such a way as to transfer the toner image on the photosensitive drum 342 to a recording paper or the like loaded on the transfer belt 333. Incidentally, since the copying machine in the embodiment excels in transfer efficiency, no cleaner part is disposed. However, a cleaner may be disposed in the copying machine in the embodiment.

A charge-eliminating charger 349 is arranged to facilitate separation of the recording paper from the transfer belt 333 by eliminating the electrostatic charge from the recording paper. A separation charger 350 is arranged to prevent the image from being disturbed by the separation discharge taking place in separating the recording paper from the transfer belt 333.

Image forming procedures to be taken in forming images on the recording paper by the copying machine which is arranged in the manner as described above are next described as follows. Recording papers are stowed in cassettes 340 and 341. The recording papers are taken out one by one from the cassette 340 or 341 by means of a pickup roller 338 or 339. The recording paper is supplied to the surface of the transfer belt 333 by means of paper feeding rollers 336 and 337. The recording paper placed on the transfer belt 333 is charged with static electricity by an attraction charger 346 and is thus caused to be attached to the transfer belt 333. When the fore end of the recording paper which is being transported by the transfer belt 333 reaches a position opposed to a paper tip sensor 347, a detection signal is outputted from the paper tip sensor 347. The detection signal from the paper tip sensor 347 is sent to the image reader part from the printer part. The detection signal is used as an auxiliary scanning synchronizing signal in sending a video signal from the image reader part to the printer part.

After that, the recording paper sheet is further transported by the transfer belt 333. Then, at the image forming parts 317 to 320, toner images are formed on the surface of the recording paper in the sequence of M, C, Y and K. After the recording paper has passed the K image forming part 320, the static electricity of the recording paper is removed by the charge-eliminating charger 349 before the recording paper is separated from the transfer belt 333.

The recording paper separated from the transfer belt 333 is charged with static electricity by pre-fixing chargers 351 and 352 to replenish a toner adsorbing power for the purpose of preventing disturbance of the toner image. The toner image on the recording paper is then thermally fixed by a fixing unit 334. After the thermal fixing process, the recording paper is discharged to a paper discharge tray 335.

FIG. 2 shows a control device for controlling a vibration motor arranged to drive the photosensitive drum at each of the image forming parts 317 to 320.

In FIG. 2, reference numeral 1 denotes the vibration motor. A vibration motor 1 is provided for the photosensitive drum of each of the image forming parts 317 to 320. Reference numeral 2 denotes a motor driver which is arranged to apply frequency voltage signals to the electric-to-mechanical energy converting elements of the vibration motor 1. The electric-to-mechanical energy converting element is made of a piezoelectric material, for example. The vibration motor 1 is composed of a vibrating body, first and second groups of electric-to-mechanical energy converting elements disposed on the vibrating body, and a contact body serving as a rotor. At the vibration motor 1, a driving force is obtained when frequency voltage signals the phases of which differ 90 degrees from each other, are applied to the first and second electric-to-mechanical energy converting element groups, and the contact body is driven by the driving force. Since the arrangement of the vibration motor 1 is well known, its details are omitted from the description given here. Reference numeral 3 denotes a high-frequency voltage control pulse generator and driving high-frequency control circuit for sending to the motor driver 2 a pulse signal for setting the voltage values and the frequency values of the frequency voltage signal. The motor driver 2 is arranged to apply the frequency voltage signals of different phases to the first and second electric-to-mechanical energy converting element groups of the vibration motor 1 in response to the pulse signal output from the high-frequency voltage control pulse generator and driving high-frequency control circuit 3.

An encoder 4 is arranged to generate a pulse signal every time the vibration motor 1 rotates a predetermined angle. A pulse comparator 5 is arranged to compare the frequency of the pulse signal sent from the high-frequency voltage control pulse generator and driving high-frequency control circuit 3 to the motor driver 2 with the frequency of the pulse signal output from the encoder 4. A CPU 6 is arranged to control the actions of the whole control device. A display control part 7 is arranged to control a display to be provided on the message display panel 391 disposed as shown in FIG. 4 at the operation part 301 of the copying machine.

In the control device arranged as described above, the pulse signal is sent from the high-frequency voltage control pulse generator and driving high-frequency control circuit 3 to the motor driver 2 and the frequency voltage signals having voltage values and frequency values corresponding to the pulse signal are applied from the motor driver 2 to the vibration motor 1, so that the vibration motor 1 operates (e.g., rotates). Then, the pulse comparator 5 compares the pulse signal (driving frequency signal) from the high-frequency voltage control pulse generator and driving high-frequency control circuit 3 with the pulse signal from the encoder 4, which corresponds to the actual rotation of the vibration motor 1. The result of comparison by the pulse comparator 5 is sent to the CPU 6. The CPU 6 then performs feedback control over the high-frequency voltage control pulse generator and driving high-frequency control circuit 3 on the basis of the result of the comparison, so as to bring the two pulse signals into a predetermined relationship.

In the meantime, immediately after the power supply of the copying machine is turned on, the photosensitive drum 342 and the transfer belt 333 are caused to rotate for warming-up. This warming-up rotation is called "preliminary multi-rotation control". An operation of the CPU 6 to be performed at the time of the preliminary multi-rotation control so as to determine the sticking state of the vibration motor 1 and to restrain the vibration motor 1 is as described below with reference to FIG. 3. In the preliminary multi-rotation control mode, the high-frequency voltage control pulse generator and driving high-frequency control circuit 3 and the motor driver 2 are operated to drive the vibration motor 1 and, at the same time, the DC motor for driving the transfer belt 333 is also caused to be driven.

Figure 3:
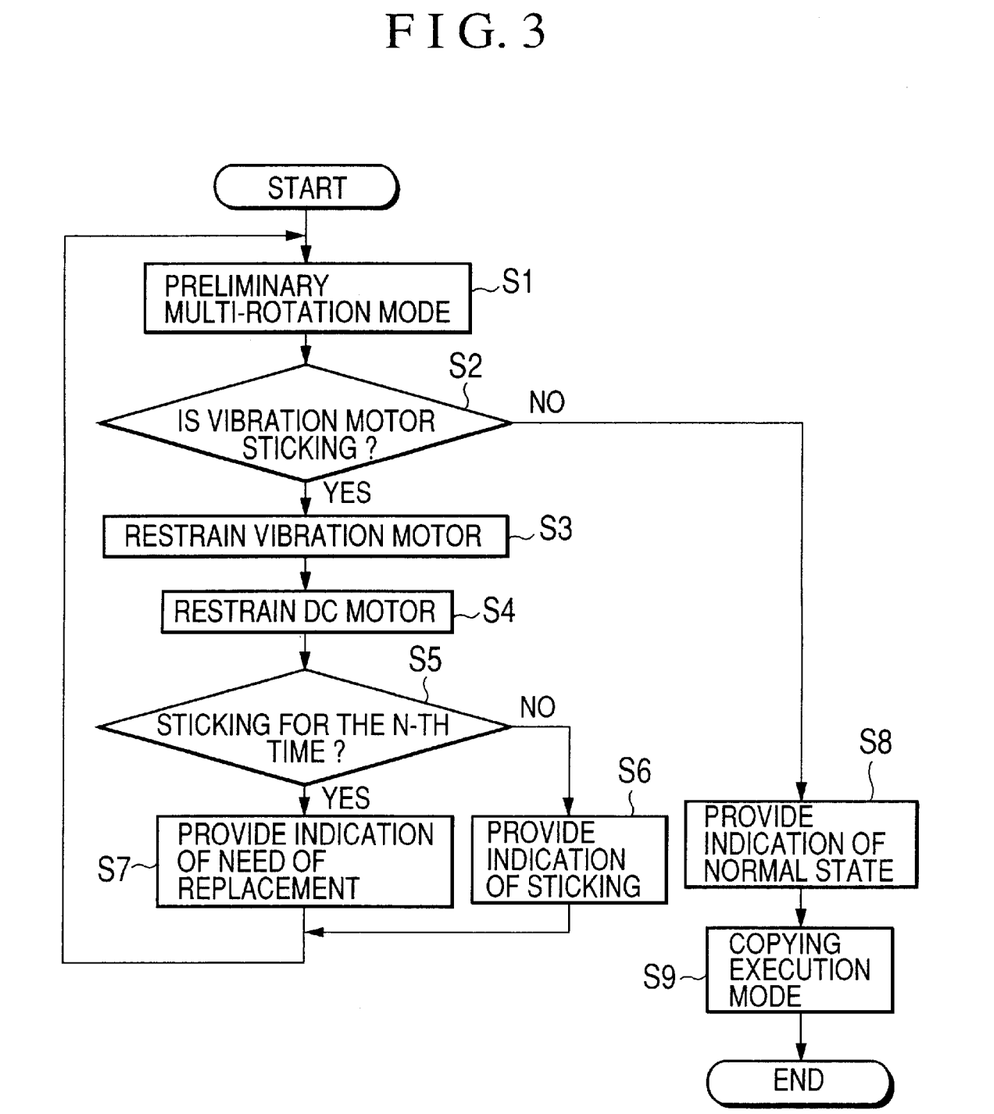
FIG. 3 is a flow chart showing the operation of the control device for the vibration motor.

Referring to FIG. 3 which is a flow chart, the CPU 6 enters the preliminary multi-rotation control mode at a step S1. At a step S2, a check is made to find if the vibration motor 1 is in a sticking state. In making the check, a pulse signal is sent for a predetermined period of time to the motor driver 2 from the high-frequency voltage control pulse generator and driving high-frequency control circuit 3 and, if the vibration motor 1 does not rotate in response to the pulse signal, the motor 1 is determined to be in the sticking state. The method of making the check for the sticking state of the vibration motor 1 may be changed to determine the motor 1 to be in the sticking state when no pulse signal is outputted from the encoder 4 after the pulse signal of the high-frequency voltage control pulse generator and driving high-frequency control circuit 3 is sent to the motor driver 2 for a predetermined period of time. If the vibration motor 1 is determined to be in the sticking state at step S2, the flow of operation proceeds to a step S3. At step S3, the pulse signal is stopped from being sent from the high-frequency voltage control pulse generator and driving high-frequency control circuit 3 to the motor driver 2, so that the frequency voltage signals are restrained from being applied to the vibration motor 1. Further, If the vibration motor 1 is determined to be in the sticking state at step S2, the count value of a counter (not shown) is incremented by one (+1). The flow then proceeds to a step S4.

At step S4, the CPU 6 sends a signal for restraining the operation of the DC motor to a control circuit (not shown) arranged to drive the transfer belt 333 (the transfer belt roller 348). By this signal, the transfer belt 333 is brought to a stop, thereby preventing the transfer belt 333, etc., from being damaged by stopping a sliding motion of the transfer belt 333 on the photosensitive drum 342.

At a step S5, check is made to find if the number of times it has been determined that the vibration motor 1 is in the sticking state at step S2 has reached a predetermined number of times N. Step S5 is executed by comparing the count value of the above-stated counter with the predetermined number of times N. If the number times of the sticking state of the vibration motor 1 determined at step S2 has not yet reached the predetermined number of times N, then the flow proceeds to step S6. At step S6, the CPU 6 causes, through the display control part 7, a message to be displayed on the message display panel 391 to show that the vibration motor 1 is in the sticking state, as shown in FIG. 4. The display of the message enables the operator of the copying machine to release the vibration motor 1 from the sticking state, for example, by manually rotating the vibration motor 1.

Further, if the vibration motor 1 is determined at step S2 not to be in the sticking state, i.e., to be in a normal state, the flow of operation proceeds to step S8. At step S8, a message indicating that the vibration motor 1 is in the normal state is displayed on the message display panel 391 in a manner as shown in FIG. 4.

Figure 5:
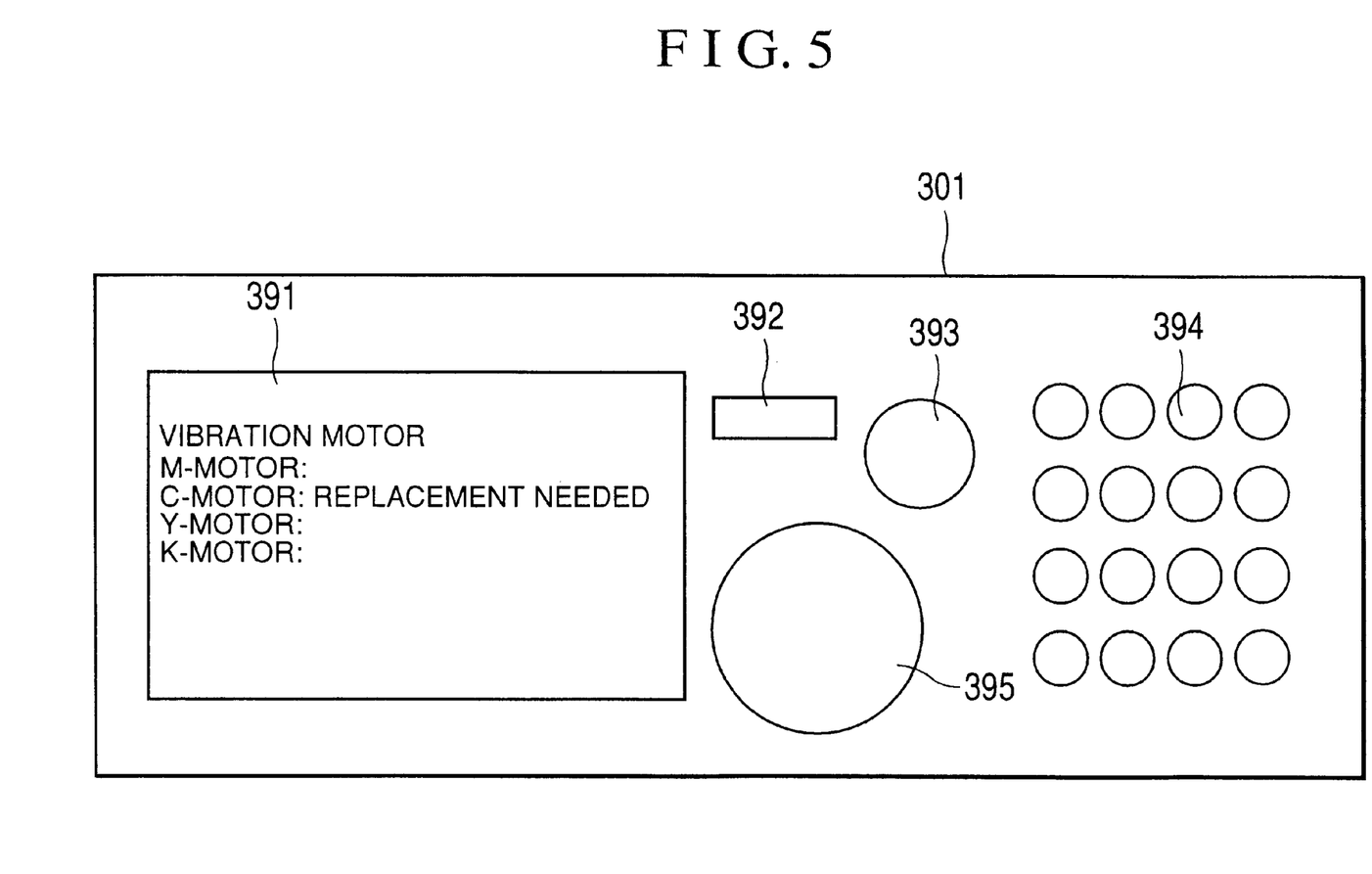
FIG. 5 is a plan view showing the same operation part provided on the copying machine.

On the other hand, if it is determined at step S5 that the number of times the vibration motor 1 has been determined to be in the sticking state at step S2 has reached the predetermined number of times N, then the flow proceeds to step S7. At step S7, the CPU 6 causes the display control part 7 to provide a display on the message display panel 391 indicating that it is time to replace the vibration motor 1, e.g., in a manner as shown in FIG. 5. The display of the message enables the operator to recognize the need for replacing the vibration motor 1. Any trouble due to malfunction of the vibration motor 1, therefore, can be prevented in due course of time. The flow returns to step S1 from step S6 or S7.

Then, when the vibration motor 1 is found at step S2 not to be in the sticking state, the flow proceeds through step S8 to step S9. At step S9, the CPU 6 comes into a copying execution mode after completion of the preliminary multi-rotation control.

Incidentally, the arrangement of the operation part 301 described in the embodiment (the arrangement of the operation keys or the display panel, the display contents of the display panel, etc.) may be made different from that illustrated in FIGS. 4 and 5.

In the case of the embodiment disclosed, the invention is applied to a copying machine having the photosensitive drum arranged to be driven by a vibration motor. However, the invention is applicable to copying machines of the kind having drive systems of photosensitive parts, transfer parts, developing parts, etc., arranged to be driven by vibration motors and also to apparatuses which are other than copying machines and are arranged to have vibration motors as their drive sources.

In the case of the embodiment disclosed, the copying machine has four photosensitive drums arranged to be operated in a batch transfer system. However, the invention is applicable likewise to a copying machine having only a single photosensitive drum.

While a control operation to be performed in the event of sticking of the vibration motor has been described in the embodiment, the invention is applicable also to any apparatus using a motor which is not a vibration motor but is also prone to sticking.

In the case of the embodiment described above, when the vibration motor 1 is found at step S2 to be not drivable, the vibration motor 1 is immediately determined to be in a sticking state and a display is provided to indicate the sticking state at step S6. However, it is possible that the vibration motor 1 might be prevented from rotating by some cause other than sticking. In view of this possibility, the flow of operation described may be changed in the following manner. At step S2, it is determined only whether the vibration motor 1 has succeeded in rotating. With the vibration motor 1 found to have failed to rotate at the check made at step S2, step S6 is executed to provide an indication indicating that an error has occurred, instead of providing an indication of the sticking state. Thus, the vibration motor 1 is not determined to be in the sticking state until it is determined at step S5 that the number of times of failure of rotation of the vibration motor 1 has reached the predetermined number of times N. If the vibration motor 1 is judged to be in sticking state through the step S5, step S7 is executed to provide an indication of the sticking state and/or an indication of the need for replacing the vibration motor 1.

Further, the embodiment disclosed is arranged to shift the flow of operation from step S6 or S7 to step S1. That arrangement, however, may be changed to have the flow not allowed to shift from step S7 to step S1 until either the power supply is turned on again or some predetermined operation is performed by the operator while the flow is allowed to shift from step S6 immediately to step S1.

Further, the flow described may be also modified as follows. The flow is not allowed to shift from step S6 to step S1 until the power supply is turned on again or until some predetermined operation is performed by the operator and, in a case where step S7 is executed, all motor driving actions are inhibited after step S7.

What is claimed is:

1. An apparatus that uses as a drive source a vibration motor including a vibrating body and a contact body in press contact with the vibrating body, and which obtains a frictional driving force by applying frequency signals having different phases to first and second electric-to-mechanical energy converting element groups disposed at the vibrating body, said apparatus comprising:

a driving circuit which drives the vibration motor by applying the frequency signals having different phases to the first and second electric-to-mechanical energy converting element groups of the vibration motor;

a determining circuit which determines whether the vibration motor is in a sticking state, in which sticking state the vibrating body and the contact body are sticking to each other; and an inhibiting circuit which inhibits said driving circuit from driving the vibration motor when said determining circuit determines that the vibration motor is in the sticking state.

2. An apparatus according to claim 1, wherein said determining circuit determines that the vibration motor is in the sticking state when the frequency signals having different phases are applied to the first and second electric-to-mechanical energy converting element groups for a predetermined period of time by said driving circuit and the vibration motor fails to rotate.

3. An apparatus according to claim 1, wherein said determining circuit determines that the vibration motor is in the sticking state when said determining circuit determines a predetermined plurality of times that the vibration motor has failed to rotate while the frequency signals having different phases were applied to the first and second electric-to-mechanical energy converting element groups for a predetermined period of time by said driving circuit.

4. An apparatus according to claim 1, further comprising indicating means for indicating that the vibration motor is in an inoperative state when the vibration motor is in the sticking state.

5. An apparatus according to claim 1, further comprising indicating means for indicating that the vibration motor should be replaced, when said determining circuit determines a predetermined plurality of times that the vibration motor is in the sticking state.

6. An apparatus according to claim 3, further comprising indicating means for indicating that the vibration motor should be replaced, when said determining circuit determines that the vibration motor is in the sticking state.

7. An apparatus according to claim 1, wherein said determining circuit determines whether the vibration motor is in a sticking state when said apparatus performs a preliminary operation prior to performing a main operation.

8. An apparatus according to claim 1, wherein said apparatus is a copying machine.

9. An apparatus that uses as a drive source a vibration motor having a vibrating body and a contact body in press contact with the vibrating body, and which obtains a frictional driving force by applying frequency signals having different phases to first and second electric-to-mechanical energy converting element groups disposed at the vibrating body, said apparatus comprising:

a driving circuit which drives the vibration motor by applying the frequency signals having different phases to the first and second electric-to-mechanical energy converting element groups of the vibration motor;

a determining circuit which determines whether the vibration motor fails to start rotating while the frequency signals having different phases are applied to the first and second electric-to-mechanical energy converting element groups;

a first inhibiting circuit which inhibits said driving circuit from driving the vibration motor when said determining circuit determines that the vibration motor has failed to start rotating;

a control circuit which causes said driving circuit to again drive the vibration motor after said first inhibiting circuit inhibits said driving circuit from driving the vibration motor, and then again causes said determining circuit to determine whether the vibration motor fails to start rotating while the frequency signals having different phases are applied to the first and second electric-to-mechanical energy conversion element groups; and a second inhibiting circuit which, when the vibration motor fails to start rotating after said control circuit controls said driving circuit to again drive the vibration motor a predetermined plurality of times, inhibits said driving circuit from again driving the vibration motor.

10. An apparatus according to claim 9, further comprising indicating means for providing an indication when said driving circuit is inhibited by said second inhibiting circuit from again driving the vibration motor.

11. An apparatus according to claim 10, wherein said indicating means indicates that the vibration motor should be replaced.

12. An apparatus according to claim 11, further comprising second indicating means for providing an indication when said driving circuit is inhibited by said first inhibiting circuit from driving the vibration motor.

13. An apparatus according to claim 9, wherein said apparatus is a copying machine.

14. An apparatus that uses as a drive source a vibration motor including a vibrating body and a contact body press contacted to the vibrating body, and which obtains a frictional driving force by applying frequency signals having different phases to first and second electric-to-mechanical energy converting element groups disposed at the vibrating body, said apparatus comprising:

a driving circuit that drives the vibration motor by applying the frequency signals having different phases to the first and second electric-to-mechanical energy converting element groups;

a determining circuit which determines whether the vibration motor fails to start rotating while the frequency signals having different phases are applied to the first and second electric-to-mechanical energy converting element groups;

an inhibiting circuit which inhibits said driving circuit from driving the vibration motor when said determining circuit determines that the vibration motor fails to start rotating;

a control circuit which causes said driving circuit to again drive the vibration motor after said inhibiting circuit first inhibits said driving circuit from driving the vibration motor, and then causes said determining circuit to again determine whether the vibration motor fails to start rotating while the frequency signals having different phases are applied to the first and second electric-to-mechanical energy converting element groups; and indicating means for providing an indication when the vibration motor fails to start rotating after said control circuit controls said driving circuit to again drive the vibration motor a predetermined plurality of times.

15. An apparatus according to claim 14, wherein said indicating means indicates that the vibration motor should be replaced.

16. An apparatus according to claim 14, wherein said apparatus is a copying machine.

* * * * *

UNITED STATES PATENT AND TRADEMARK OFFICE
CERTIFICATE OF CORRECTION

PATENT NO. : 6,133,840

DATED : October 17, 2000

INVENTOR(S) : NAOHISA NAGATA, ET AL.

It is certified that error appears in the above-identified patent and that said Letters Patent is hereby corrected as shown below:

COLUMN 1

Line 49, "simple" should read --simply--.

COLUMN 4

Line 53, "signal." should read --signals.--.

UNITED STATES PATENT AND TRADEMARK OFFICE
CERTIFICATE OF CORRECTION

PATENT NO.   :   6,133,840

DATED        :   October 17, 2000

INVENTOR(S)  :   NAOHISA NAGATA

It is certified that error appears in the above-identified patent and that said Letters Patent is hereby corrected as shown below:

<u>COLUMN 6</u>

Line 3, "a" should be deleted and "check" should read --a check--.

<u>COLUMN 7</u>

Line 16, "in" should read --in the-- and "the" should be deleted.

Signed and Sealed this

Twenty-second Day of May, 2001

Attest:

NICHOLAS P. GODICI

*Attesting Officer*       *Acting Director of the United States Patent and Trademark Office*